United States Patent [19]
Suzuki et al.

[11] Patent Number: 5,916,833
[45] Date of Patent: Jun. 29, 1999

[54] SINTERED CERAMIC BODIES AND CERAMIC METAL WORKING TOOLS

[75] Inventors: Keiji Suzuki, Aichi-ken; Takayoshi Morishita, Kanagawa-ken; Tetsuji Yogo, Aichi-ken, all of Japan

[73] Assignee: NGK Spark Plug Company Limited, Aichi-ken, Japan

[21] Appl. No.: 08/744,861

[22] Filed: Nov. 6, 1996

[30] Foreign Application Priority Data

Nov. 7, 1995 [JP] Japan ................................. 7-314839
Nov. 28, 1995 [JP] Japan ................................. 7-333932

[51] Int. Cl.$^6$ .......................... C04B 35/56; C04B 35/58; C04B 35/101
[52] U.S. Cl. ................ 501/87; 252/516; 252/518.1; 252/520.2; 252/520.22; 252/520.5; 501/96.1; 501/96.3; 501/103; 501/104; 501/105; 501/127
[58] Field of Search .................. 252/516, 518.1, 252/520.2, 520.22, 520.5; 501/87, 96.1, 96.3, 103, 104, 105, 127

[56] References Cited

U.S. PATENT DOCUMENTS

| | | | |
|---|---|---|---|
| 4,598,053 | 7/1986 | Yamakawa et al. | 51/309 |
| 4,626,518 | 12/1986 | Watanabe et al. | 501/103 |
| 5,068,072 | 11/1991 | Horinouchi et al. | 252/520 |
| 5,169,810 | 12/1992 | Jones | 501/96 |

FOREIGN PATENT DOCUMENTS

| | | |
|---|---|---|
| 60-180958 | 9/1985 | Japan . |
| 62-216962 | 11/1987 | Japan . |
| 63-222071 | 9/1988 | Japan . |
| 01-308870 | 12/1989 | Japan . |
| 01-308871 | 12/1989 | Japan . |
| 02-258674 | 10/1990 | Japan . |
| 04-342463 | 11/1992 | Japan . |
| 2533863 | 11/1996 | Japan . |

*Primary Examiner*—Anthony Green
*Attorney, Agent, or Firm*—Browdy and Neimark

[57] ABSTRACT

A sintered ceramic body which can be worked by electrical discharge machining, has high mechanical strength, and can be worked into sintered ceramic tools which have long life is disclosed. Further, sintered ceramic tools which have long life and scarcely cause flaws in work pieces are provided. The sintered ceramic body comprises ceramic particles having specific particle diameter and particle distribution.

15 Claims, 2 Drawing Sheets

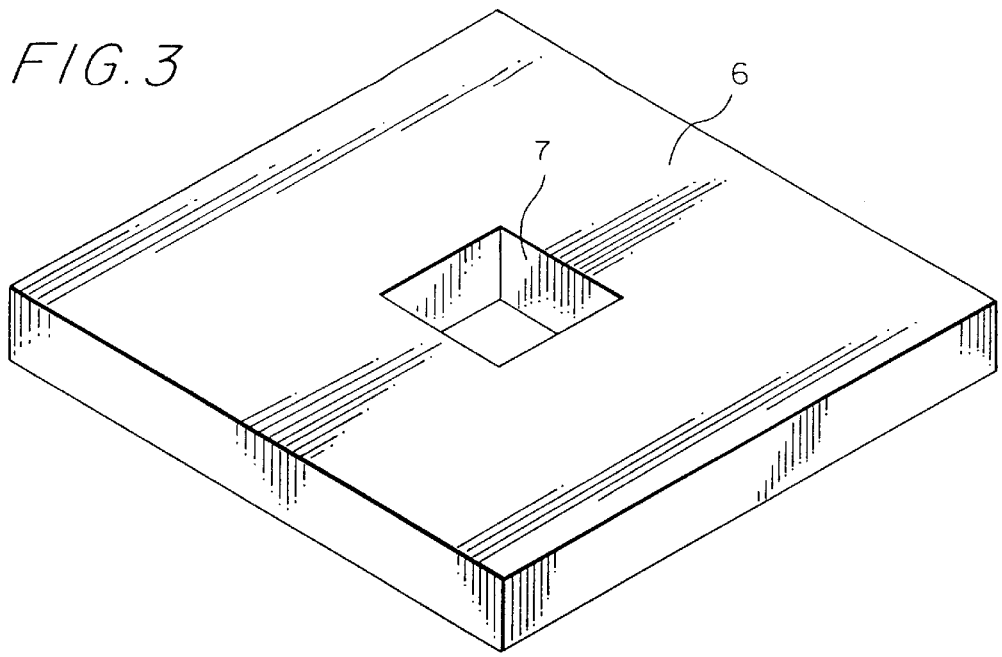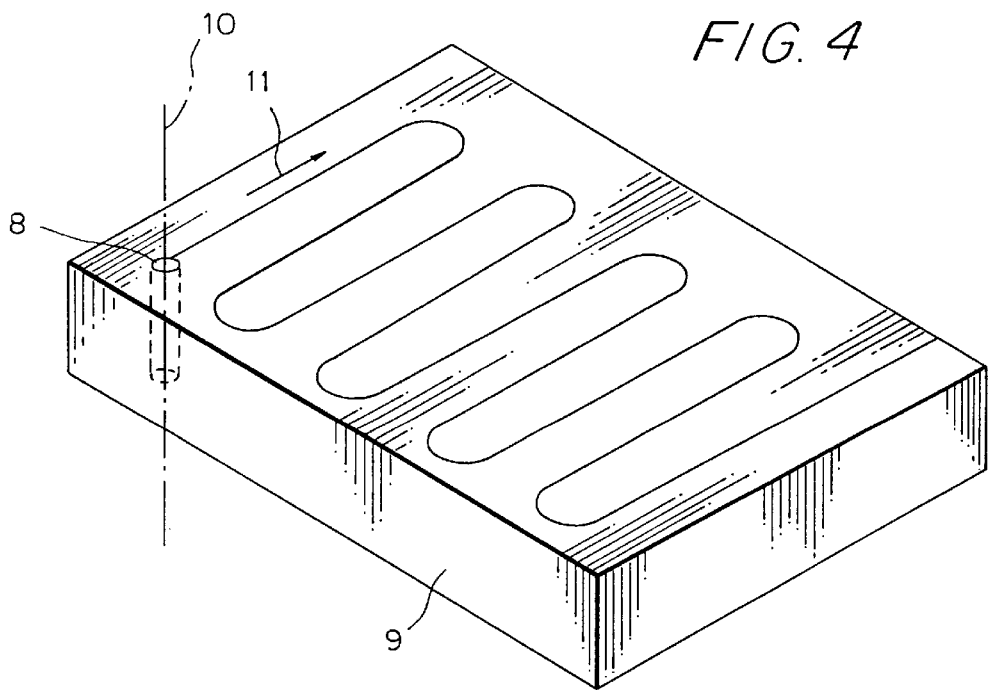

SINTERED CERAMIC BODIES AND CERAMIC METAL WORKING TOOLS

FIELD OF THE INVENTION

The present invention relates to sintered ceramic bodies, a process for preparing the ceramic bodies, ceramic metal working tools prepared from said ceramic bodies and a process for preparing the ceramic metal working tools.

More particularly, the invention relates to sintered ceramic bodies which can be worked by wire cutting electrical discharge machining or die-milling electrical discharge machining, without mechanical properties such as strength impaired, wherein the wire cutting and die-milling electrical discharge machinings can be stably carried out; a process for preparing such ceramic bodies; long life ceramic metal working tools which scarcely cause flaws in work pieces; and a process for preparing such ceramic metal working tools.

Typical examples of the "metal working tool" are punch and/or punching die for punching (blanking) metal plates.

BACKGROUND OF THE INVENTION

Ceramic materials are excellent in mechanical properties, especially high temperature strength, hardness, thermal shock resistance, as well as oxidation resistance, corrosion resistance, etc., but it is said that they are remarkably inferior to metallic materials in workability.

Recently, high strength and high hardness materials such as cemented carbide materials have come to be shaped by electrical discharge machining, and the technique is making a rapid progress. Electrical discharge machining generally includes wire cutting electrical discharge machining and die-milling electrical discharge machining.

Wire cutting electrical discharge machining is a shaping process which comprises using a thin wire of copper or brass having a diameter of 0.05–0.25 mm, which is wound up under tension, as an electrode, generating discharge energy between the wire and a work piece, advancing the wire like a jigsaw and thus forming a two-dimensional shape.

Die-milling electrical discharge machining is a method in which an electrode of a specific shape is used and the inverted shape is formed by electric discharge between the electrode and a work piece.

Application of electrical discharge machining to ceramic materials, which are believed to be difficult to shape thereby, is lately being studied. As a result, it has been revealed that $ZrO_2$ and $Al_2O_3$ are made shapable by electrical discharge machining by addition of a suitable amount of TiN, TiC, TiCN, $TiB_2$, ZrN, NbC, etc.; and $Si_3N_4$ are made shapable by addition of TiN, ZrN, etc.

In electrical discharge machining, the influence of the working area effect is great. Therefore, it is necessary that minute protrusions exist dispersed and distributed all over the working area in order to easily induce electric discharge and stably conduct the electrical discharge machining. In this case, the smaller the working area, the smaller the degree of distribution, and thus electric discharge tends to occur at localized positions or points. Therefore, it is required to work with a smaller impact coefficient by reducing working speed, discharge voltage, etc. The "working area effect" herein referred to means the drop of working speed when the working area is excessively small.

In the wire cutting electrical discharge machining, the working surface is a small area facing the thin wire electrode and thus the machining always suffers the influence of the working area effect.

When a ceramic body containing electrically conductive ceramics is worked by wire cutting electrical discharge machining, the minute area facing the wire electrode is the particles of the conductive ceramic per se. Therefore, if the conductive ceramic particles are not uniformly distributed in a sintered ceramic body, stable wire cutting electrical discharge machining is impossible.

As a measure for improving efficiency of wire cutting electrical discharge machining, it is thinkable to increase the amount of conductive ceramics to be added. However has been revealed that increase of conductive ceramics impairs the inherent mechanical properties such as strength, hardness, etc. of sintered ceramic bodies.

When conductive ceramics are added, the conductive ceramics must be uniformly distributed in order to stably carry out the wire cutting electrical discharge machining. In this case, if large particle size conductive ceramics are used, the particles cause the working area effect and the wire electrode is broken unless the working speed is reduced.

In die-milling electrical discharge machining, the electrode is remarkably larger in comparison with a wire and the working area is far larger in the working direction than in case of the wire electrode, and the working area effect is effectively exhibited and the areal working speed can be enhanced.

In addition to the above-mentioned workability, sintered ceramic bodies involve the following problems.

Generally in the shaping work using a die, in punching work for instance, work pieces slide on the surface of the die and simultaneously the die per se suffers a great stress. When this is repeated, the die surface becomes abraded. Microscopic observation of the abrasion reveals that it is caused by wearing of particles of the component constituting the tool, drop-off of particles per se of the component constituting the tool and simultaneous occurrence of the two phenomena.

In the case of cemented carbide tools, as they are used repeatedly, work pieces come to be stained, that is, they are contaminated by the cemented carbide material. The cemented carbide tools having suffered surface abrasion can be reshaped by grinding and polishing for further use, although they are discarded when they cannot be reshaped because of their complicated shape.

On the other hand, sintered ceramic tools are free from staining of work pieces and suffer less abrasion because of hardness of the particles and tool life (time period until reshaping is required) is longer than the cemented carbide tools.

Although sintered ceramic tools suffer less abrasion by drop-off of particles because of strong bond between the particles in comparison with cemented carbide tools, once particle drop-off abrasion happens and especially large particles drop off, reshaping is required at this stage. But the tools are discarded if the shape is complicated and reshaping is impossible. Also when large diameter particles drop off, work pieces being shaped by such tools are susceptible to scratching and thus rejectable products are turned out.

The present invention has been completed in order to solve the above-mentioned various problems relating to sintered ceramic tools. That is, the object of this invention is to provide sintered ceramic bodies, from which can be prepared long life metal working tools, which have excellent mechanical properties, hardly cause flaws in work pieces and can be easily manufactured. Further, another object of the present invention is to provide sintered ceramic bodies which are shapable by both wire cutting electrical discharge machining and die-milling electrical discharge machining and can be formed into metal working tools. A still further object of this invention is to provide ceramic tools, which provided with surface smoothness as required in tools which are easily manufactured by electrical discharge machining, have long life as tools, and scarcely cause flaws in work pieces.

SUMMARY OF THE INVENTION

The invention provides: Sintered ceramic bodies comprising ceramic particles whose mean particle diameter is not larger than 3 μm and whose particle diameter at the cumulative amount ratio of 90% is not larger than 10 μm.

In these sintered ceramic bodies, the mean particle diameter is preferably not larger than 3 μm and the particle diameter at the cumulative amount ratio of 90% is preferably not larger than 7 μm.

In these sintered ceramic bodies, the mean particle diameter is more preferably not larger than 0.5 μm and the particle diameter at the cumulative amount ratio of 90% is more preferably not larger than 2 μm.

The invention further provides: Sintered ceramic bodies comprising insulating ceramic particles and electrically conductive ceramic particles, wherein the particle diameter of the insulating ceramic particles at the cumulative amount ratio of 90% is not larger than 10 μm and the mean particle diameter of the electrically conductive ceramic particles is not larger than 10 μm, and the content of the electrically conductive ceramic particles is 25–60 vol % on condition that the total of the conductive ceramic particles and the insulating ceramic particles is 100 vol %.

In these sintered ceramic bodies, the ratio ($\epsilon$) of the mean particle diameter of the insulating ceramic particles (dm) to the mean particle diameter of the conductive ceramic particles (dsp) is preferably not larger than 9.

In these sintered ceramic bodies, the mean particle diameter of the conductive ceramic particles is preferably 0.3–10 μm.

In these sintered ceramic bodies, the mean particle diameter of the conductive ceramic particles is more preferably 0.5–4 μm.

In these sintered ceramic bodies, the content ratio of the conductive ceramic particles is preferably 30–50 vol %.

In these sintered ceramic bodies, wherein the ratio is more preferably 0.01–9.

In these sintered ceramic bodies, preferably the electric resistivity is not higher than 10 Ω.cm.

In these sintered ceramic bodies, more preferably the electric resistivity is not higher than 5 Ω.cm.

In these sintered ceramic bodies, most preferably the electric resistivity is not higher than 0.1 Ω.cm.

In these sintered ceramic bodies, preferably the insulating ceramic particles are at least one selected from the group consisting of zirconia and alumina and the conductive ceramic particles are at least one selected from the group consisting of titanium nitride, zirconium nitride, titanium carbide, titanium carbonitride, titanium boride, tungsten carbide and niobium carbide.

In these sintered ceramic bodies, more preferably the zirconia is at least one partially stabilized zirconium selected from the group consisting of zirconium oxide stabilized with 1.5–6 mol % of $Y_2O_3$, zirconium oxide stabilized with 8–10 mol % of MgO and zirconium oxide stabilized with 6–12 mol % of $CeO_2$.

The invention still further provides: A process for preparing sintered ceramic bodies comprising ceramic particles comprising insulating ceramic particles whose particle diameter at the cumulative amount ratio of 90% is not larger than 10 μm and conductive ceramic particles whose mean particle diameter is not larger than 10 μm, wherein the content ratio of the conductive ceramic particles is 25–60 vol % on condition that the total of the conductive ceramic particles and the insulating ceramic particles is 100 vol %, said process comprising insulating ceramic particles whose particle diameter at the cumulative amount ratio of 90% is not larger than 10 μm and conductive particles whose mean particle diameter is not larger than 10 μm with a ratio of 25–60 vol % on condition that the total amount of the insulating ceramic particles and conductive ceramic particles is 100 vol %, compacting the mixture and sintering the compact.

In this process for preparing sintered ceramic bodies, preferably the insulating ceramic particles having a particle diameter at the cumulative amount ratio of 90% is less than 10 μm is used.

The invention still further provides: A metal working tool comprising a sintered ceramic body comprising ceramic particles comprising insulating ceramic particles whose particle diameter at the cumulative amount ratio of 90% is not larger than 10 μm and conductive ceramic particles whose mean particle diameter is not larger than 10 μm, and the content ratio of the conductive ceramic particles is 25–60 vol % on condition that the total of the conductive ceramic particles and the insulating ceramic particles is 100 vol %.

In this metal working tool, preferably the mean particle diameter of the conductive ceramic particles is 0.3–10 μm.

In this metal working tool, more preferably the particle diameter of the conductive ceramic particles is 0.5–4 μm.

The invention still further provides: A process for preparing metal working tools comprising shaping by electrical discharge machining a sintered ceramic body comprising ceramic particles comprising insulating ceramic particles whose particle diameter at the cumulative amount ratio of 90% is not larger than 10 μm and conductive ceramic particles whose mean particle diameter is not larger than 10 μm, and the content ratio of the conductive ceramic particles is 25–60 vol % on condition that the total of the conductive ceramic particles and the insulating ceramic particles is 100 vol %.

DETAILED DESCRIPTION OF THE INVENTIONS

In one aspect of the present invention, sintered ceramic bodies of this invention can be made from ceramic materials such as zirconia, alumina, titanium nitride, silicon nitride, silicon carbide, etc. as well as a mixture of these compounds.

The sintered ceramic body of this aspect of the present invention comprises ceramic particles whose mean particle diameter is not larger than 3 μm and whose particle diameter at the cumulative amount ratio of 90% is not larger than 10 μm.

The term "mean particle diameter" of the ceramic particles in the sintered ceramic bodies means particle diameter at the cumulative amount ratio of 50%.

The term "cumulative amount ratio" can be determined by polishing a sintered ceramic body to mirror smoothness, effecting plasma etching and measuring particle size distribution in an SEM photograph by the Schwarts-Saltykov method.

In case that the mean particle diameter is not larger than 3 μm, the possibility is small that particles drop off from the surface of the sintered ceramic body during shaping and the resulting tool little causes flaws in the work piece during the punching work. In case that the ceramic particle diameter at the cumulative amount ratio of 90% is not larger than 10 μm, in addition to the condition that the mean particle diameter is not larger than 3 μm, occurrence of flaws in the work pieces, which are worked with a ceramic tool made of said sintered ceramic body, is prevented.

That is, even when the mean particle diameter of the ceramic particles in the sintered ceramic body forming the ceramic tool is not larger than 3 μm, if the particle size distribution is too broad, the probability of drop-off of large particles is high. By restricting the particle diameter at the cumulative amount ratio of 90% to not larger than 10 μm, damage of work pieces can be held minimum. The flaws in the tool surface caused by the particle drop-off is 3 μm in size at the largest. Even if particles drop off from the tool surface, the size of flaws caused in the tool by the particle drop-off is, in most cases, of the same level as the particle size of the grinder used when the tool is polished. Thus the size of flaws caused in the work pieces is of the same level as the surface condition of the polished tool. Therefore, even if the tool surface has such flaws, the tool can be further used without turning out rejectable products.

Sintered ceramic bodies, of which the mean particle diameter is not larger than 3 μm and the particle diameter at the cumulative amount ratio of 90% is not larger than 10 μm, should preferably comprise electrically insulating particles, especially particles of zirconia and/or alumina and conductive ceramic particles, especially particles of titanium nitride, for the purpose of preparing metal working tools. Metal working tools made of such combined ceramics have excellent thermal conductivity and thus less suffer breakage due to thermal expansion when they are used in combination with metal members. Such metal working tools also have high hardness and thus less suffer breakage due to mechanical contact in working and, therefore, less causing flaws in work pieces.

In the other aspect of the present invention, the sintered ceramic bodies is shapable by electrical discharge machining if they satisfy other conditions, because they contain conductive ceramic particles.

Examples of the above-mentioned insulating ceramic materials are zirconia, alumina, silicon nitride, etc. The zirconia includes partially stabilized zirconia prepared with addition of known stabilizing agents such as $Y_2O_3$, MgO, $CeO_2$, etc. and unstabilized zirconia prepared without the stabilizing agents. The insulating ceramic materials can be used singly or in combination of two or more.

Preferred insulating ceramic materials are at least one selected from a group consisting of zirconia and alumina. The preferred zirconia includes unstabilized and partially stabilized zirconia.

Preferred examples of the partially stabilized zirconia are zirconium oxide stabilized with 1.5–6 mol % of $Y_2O_3$, zirconium oxide stabilized with 8–10 mol % of MgO, zirconium oxide stabilized with 6–12 mol % of $CeO_2$, etc. The molar ratios are based on the amount of zirconium oxide.

Examples of the above-mentioned conductive ceramic materials are titanium nitride, titanium carbide, titanium boride, tungsten carbide, zirconium nitride, titanium carbonitride, niobium carbide, etc.

In the second aspect of the present invention, sintered ceramic bodies containing conductive ceramic particles and insulating ceramic particles should preferably contain insulating ceramic particles whose particle diameter at the cumulative amount ratio of 90% is not larger than 10 μm and conductive ceramic particles whose mean particle diameter (dsp) is not larger than 10 μm, preferably 0.3–10 μm and more preferably 0.5–4 μm.

When the particle diameter at the cumulative amount ratio at 90% is not larger than 10 μm, the resulting sintered ceramic bodies can be suitably worked by wire cutting electrical discharge machining. The damage of work pieces caused by particles drop-off from the tools made of such sintered ceramic bodies can be held minimum.

Further, when the mean particle diameter (dsp) of conductive ceramic particles is not larger than 10 μm, in addition to the condition that the particle diameter at the cumulative amount ratio of 90% is not larger than 10 μm, the mechanical strengths, especially bending strength and fracture toughness as well as transverse rupture strength of the obtained sintered ceramic bodies are improved and they have long tool life.

In the sintered ceramic bodies of the present invention, also it is important that the ratio ($\epsilon$) of the mean particle diameter of the insulating ceramic particles (dm) and the mean particle diameter of the conductive ceramic particles (dsp) ($\epsilon$=dsp/dm) is not larger than 9, especially 0.01–9.

When said ratio ($\epsilon$) is not larger than 9, the surface roughness (Ra) of the resulting sintered ceramic bodies is not more than 5 μm, the dies made from such sintered ceramic bodies scarcely cause flaws in work pieces.

It is important that the sintered ceramic bodies of the present invention comprises insulating ceramic particles whose particle diameter at the cumulative amount ratio of 90% is not larger than 10 μm and conductive ceramic particles whose mean particle diameter is not larger than 10 μm in a ratio of 25–60 vol %, preferably 30–50 vol % of the latter with the combined amount as 100 vol %.

With conductive ceramic particles of less than 25 vol %, the resulting sintered ceramic body cannot be shaped by wire cutting electrical discharge machining.

The sintered ceramic bodies of the present invention have a resistivity of not higher than 10 Ω.cm, preferably not higher than 5 Ω.cm and more preferably nor higher than 0.1 Ω.cm. Sintered ceramic bodies having a resistivity of higher than 10 Ω.cm cannot be suitably worked by wire cutting electrical discharge machining.

The sintered ceramic bodies of the present invention can be suitably prepared as follows.

First of all, ceramic powder (hereinafter the term "powder" is used meaning particles collectively), comprising especially an insulating ceramic powder and a conductive ceramic powder, is mixed in a wet ball mill for instance, using a liquid which comprises a binder such as wax binders, acrylic binders, poval binders, etc. dispersed in a medium such as water, alcohols, ketones, etc.

When the sintered ceramic bodies, whose mean particle diameter (dm) of not larger than 3 μm and particle diameter at the cumulative amount ratio of 90% is not larger than 10 μm, are prepared, the mean particle diameter of the ceramic particles to be wet-mixed should be not larger than 3 μm, preferably not larger than 0.5 μm and the particle diameter at the cumulative amount ratio of 90% should preferably be not less than 7 μm and more preferably not less than 2 μm.

When sintered ceramic bodies are prepared, insulating ceramic particles whose particle diameter at the cumulative amount ratio of 90% is less than 10 μm should be used because insulating ceramic powders undergo crystal growth during the sintering process. The particle diameter at the cumulative amount ratio of 90% of the insulating ceramic particles to be used should preferably be not more than 8 μm, more preferably not more than 3 μm and most preferably not more than 1.5 μm.

After the wet mixing, the medium (solvent) of the binder dispersion is removed by a suitable means such as spray drying.

The obtained granulated powder may be calcined in order to adjust the particle size distribution. The calcination is carried out by heat-treating the stock powder at a temperature of 800–1200° C. in the atmosphere for insulating ceramic powder and in an inert atmosphere for conductive ceramic powder for 1–3 hours. Calcination causes crystal growth of the ceramic particles.

The uncalcined granulated powder and calcined granulated powder are mixed aiming that the particle diameter at the cumulative amount ratio be not larger than 10 μm if necessary. The particle size adjustment also can be effected by mixing size-classified particles.

The granulated powder whose particle size has been adjusted is shaped into a desired shape by press molding. Press molding can be effected by rubber molding, die molding, injection molding, extrusion molding, etc.

The thus formed green compact is degreased, that is, the binder is removed if oxidation of the particles at high temperature in the atmosphere is feared.

Degreasing or binder-removing is effected by heat-treating the compact at a temperature of 300–800° C., preferably 450–530° C. at which the binder is decomposed, preferably in an inert atmosphere, preferably of nitrogen or argon. Thus the binder is decomposed and organic material composing the binder is removed. The binder sometimes burns due to a trace amount of oxygen which exists in an inert atmosphere or by heating in the degreasing or binder-removing. In this case, the binder is also removed.

The degreased compact is sintered. The compact can be sintered as is, but it may be pre-sintered before prior to main sintering.

In pre-sintering, the degreased compact is heated under pressure until 95%, preferably 95–97% of fraction to the theoretical density is attained. The temperature employed for pre-sintering is, especially when zirconia is used as an insulating ceramic, usually 1450–1650° C., preferably 1480–1550° C. The pressured applied is usually 1–10 atm, preferably 2–5 atm.

In sintering, the compact as is or pre-sintered compact is heated under pressure until 99–100% of fraction to the theoretical density is attained. The pressure applied in sintering is usually 500–2000 atm, preferably 800–1500 atm.

The atmosphere in which pre-sintering or main sintering is carried out is an inert gas such as nitrogen, argon, etc.

Thus sintered ceramic bodies of the present invention can be prepared.

The thus obtained sintered ceramic bodies are dense free from minute pores in interior and in the surface. The sintered ceramic bodies can be formed into metal working tools by electrical discharge machining, especially by wire cutting electrical discharge machining.

The metal working tool prepared from the sintered ceramic bodies has high hardness, higher thermal conductivity, excellent shock resistance, toughness, wear resistance, and attains dramatically increased number punching shot because of these characteristics. The metal working tool prepared from the sintered ceramic bodies of the present invention does not cause staining of work pieces when punching work is carried out with it. When lead frames are manufactured by punching for instance, conventional tools cause staining or contamination of on lead frames, which exerts undesirable influence on the final products. But the metal working tool of the present invention is free from such staining of lead frame.

BRIEF DESCRIPTION OF THE ATTACHED DRAWINGS

Now the invention will be specifically described with reference to the attached drawings, of which:

FIG. 3 is a perspective view of an example of a punching die.

FIG. 4 is a perspective view of a ceramic body which undergoes die-milling and wire cutting electrical discharge machining for the evaluation of machinability thereof.

EMBODIMENTS OF THE INVENTION

Preferable metal working tools of the invention include a punching die and a punch to be received in the opening of the punching die.

Lead frames used when semi-conductor integrated circuit chips are manufactured can suitably be prepared using a punching die and a punch prepared from the sintered ceramic bodies of the present invention.

Figure 1:
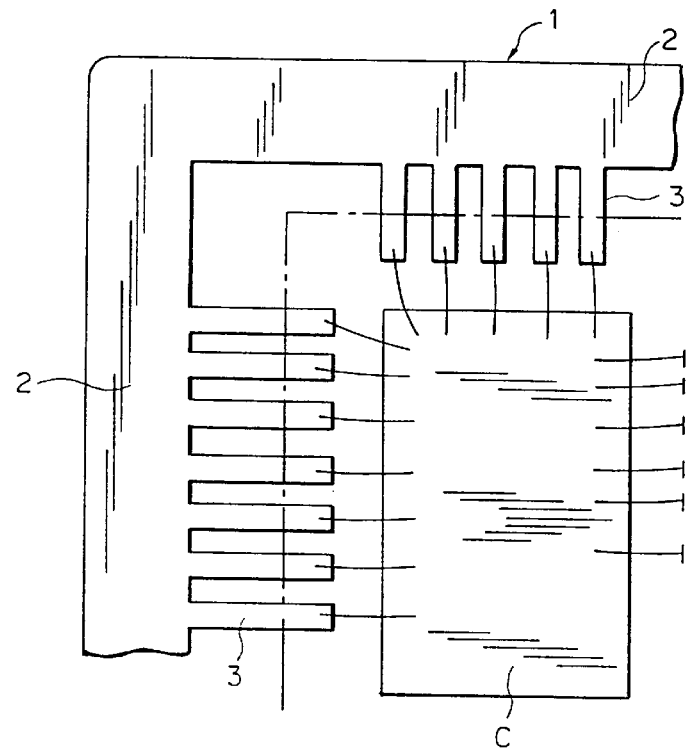
FIG. 1 is a schematic view of a lead frame illustrating the principle of manufacturing semi-conductor chips using the lead frame.

As shown in FIG. 1, lead frame 1 comprises a frame proper 2 and leads 3 extending from the frame proper. In FIG. 1, a semi-conductor integrated circuit base plate is indicated by C. FIG. 1 represents only one example of the lead frames and it should be understood that there are lead frames of various shapes which can be manufactured using metal working tools prepared from the sintered ceramic bodies of the present invention.

Figure 2:
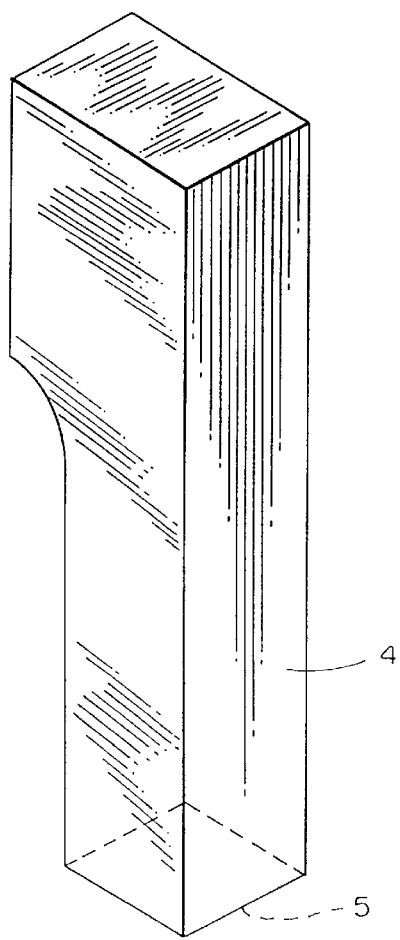
FIG. 2 is a perspective view of an example of a punch used for punching metal plate.

In FIG. 2, an example of the sintered ceramic body punch of the present invention is shown. The punch 4 has an end surface 5 which corresponds to the opening provided in a punching die. Needless to say, openings to be provided in metal sheets are varied according to the designing of lead frames and, therefore, the shape of the opening of the punching die and the end surface of the punch is varied.

When lead frames are manufactured, either or both of a punch prepared from the sintered ceramic body of the present invention and a punching die prepared from the sintered ceramic body of the present invention can be employed. When either of the punch and the punching die prepared from the sintered ceramic body of the present invention is used, usually the corresponding punching die or punch made of cemented carbide is used.

On a punching die provided with opening or openings of predetermined shapes, a sheet of copper or a copper alloy, of which a lead frame used for packaging semi-conductor integrated circuit chips is made for instance, is placed and a punch of the corresponding shape is plunged so as to enter the opening or openings in the punching die. The punch is plunged and raised at a high speed while the metal plate is horizontally shifted and thus necessary opening or openings are formed in the metal sheet to be a lead frame.

The metal working tools of the present invention prepared from the sintered ceramic bodies of the present invention have high hardness, high electric resistivity, excellent shock resistance, excellent toughness, excellent wear resistance and, therefore, have dramatically increased number of punching shots because of these excellent characteristics.

EXAMPLE 1

In this example, a combination of a punch of sintered zirconia of the present invention and a die of cemented carbide for making lead frames to be used when semiconductor integrated circuits (IC) was used as an example of the working metal tools of the invention.

Punches were made as follows.

A slurry was prepared by dispersing a zirconia powder partially stabilized with 3 mol % of $Y_2O_3$ having a mean diameter of 0.5 μm and micro wax in ethanol in a wet ball mill. The resulting slurry was spray-dried and a granulated powder was obtained.

The granulated powder was calcined at a temperature of 800–1200° C. for 1 hour in the atmosphere. The calcined granulated powders and uncalcined granulated powder were mixed aiming that the particle diameter at the cumulative amount ratio of 90% was not larger than 10 μm.

The mixed granulated powders were shaped into plate form.

The plate shape green compacts were sintered at various temperatures in the range of 1400–1600° C. Thus sintered zirconia bodies of various mean particle diameters and particle diameters at the cumulative amount ratio of 90% as shown in Table 1 were obtained.

The sintered zirconia bodies were shaped with a diamond cutter to make punches as shown as 4 in FIG. 2.

Using the thus formed punches and a cemented carbide punching die as shown as 6 in FIG. 3 having a punching hole 7 which receives the punch, punching was tested.

For the purpose of comparison with the punch of sintered zirconia body, punching with cemented carbide punches was also carried out by punching copper sheets. The used cemented carbide was "FM10" marketed by Hitachi Tools Co. Ltd.

Plates of the ceramic bodies were separately prepared as described above. The surface thereof was polished to mirror smoothness, subjected to plasma etching, and the particle size distribution was measured by SEM in accordance with the Scharts-Saltykov method.

In Table 1, mean particle diameters and particle diameters at the cumulative amount ratio of 90% of the particles used for preparation of the sintered zirconia bodies are shown together with the life of the punch, that is, the number of punching shots before the punches required reshaping. The larger the number of punching shots, the longer the punch life.

In Table 1, the degree of flaws in work pieces at the millionth shot is also indicated in Table 1. In the column of "Degree of Flaws", ○ means that Rmax measured by the surface roughness measuring device is not more than 8 μm, Ra is not more than 0.8 μm and there are few or no visually observable flaws in the work pieces.

Δ means that Rmax measured by the surface roughness measuring device is 8–15 μm, Ra is 0.8–1.5 μm and there are visually observable flaws in the work pieces and the degree thereof is at the same level as in the case with cemented carbide dies.

X means that Rmax measured by the surface roughness measuring device is not less than 15 μm, Ra is not less than 1.5 μm and there are visually observable flaws in the work pieces and the degree thereof is larger than in the case with cemented carbide dies.

TABLE 1

(Sintered Zirconia Punches)

| No. | 1 | 2 | 3 | 4 | 5 | 6 | 7 | *8 | 9 | *10 | *11 | Control |
|---|---|---|---|---|---|---|---|---|---|---|---|---|
| Mean Particle Diameter (μm) | 0.3 | 0.4 | 0.8 | 0.8 | 1.6 | 1.6 | 2.3 | 2.5 | 2.6 | 3.3 | 3.8 | Cemented Carbide Punch |
| Particle Diameter at 90% Cumulative Volume Ratio (μm) | 0.7 | 0.9 | 1.9 | 2.2 | 5.5 | 7.8 | 7.9 | 11.8 | 6.5 | 7.1 | 10.5 | |
| Life (Number of Punching Shots) Unit, Thousands | 10,200 | 10,500 | 8,700 | 7,300 | 4,900 | 4,020 | 2,710 | 1,450 | 2,600 | 1,890 | 1,210 | 2,500 |
| Flaws in Work Pieces | ○ | ○ | ○ | ○ | ○ | ○ | Δ | X | Δ | X | X | Δ |

*Outside of the Claimed Invention

EXAMPLE 2

In this example, a combination of a punch made of sintered alumina-zirconia bodies of the present invention and a cemented carbide punching die as used in Example 1 was used.

Punches were made as follows.

A slurry was prepared by dispersing the zirconia powder partially stabilized with $Y_2O_3$ used in Example 1 and a high purity alumina having a mean particle diameter of 0.5 μm in the weight ratio of 80 : 20 together with micro wax as a binder in distilled water in a wet ball mill.

The resulting slurry was spray-dried and a granulated powder was obtained.

Plate shape sintered alumina-zirconia bodies were prepared in the same manner as in Example 1 except that the sintering temperature was 1400–1700° C.

The thus prepared sintered alumina-zirconia bodies were further subjected to the HIP treatment, that is, they were heat-treated at 1500° C. under the pressure of 1000 atm for 2 hours.

The resulting sintered alumina-zirconia bodies were formed into punches in the same manner and the punching test and the particle size distribution measurement were carried out as in Example 1.

The test results were evaluated in the same manner as in Example 1 and the test results and evaluation are indicated in Table 2.

TABLE 2

(Sintered Aluminia-Zirconia Punches)

| No. | 1 | 2 | 3 | 4 | 5 | 6 | 7 | *8 | 9 | *10 | *11 | Control |
|---|---|---|---|---|---|---|---|---|---|---|---|---|
| Mean Particle Diameter ($\mu$m) | 0.7 | 0.7 | 1.1 | 1.4 | 2.1 | 2.3 | 2.6 | 2.6 | 2.7 | 3.2 | 3.5 | Cemented Carbide Punch |
| Particle Diameter at 90% Cumulative Volume Ratio ($\mu$m) | 1.9 | 2.7 | 4.3 | 5.8 | 7.7 | 6.5 | 8.9 | 10.8 | 7.9 | 8.7 | 12.8 | |
| Life (Number of Punching Shots) Unit, Thousands | 9,820 | 8,910 | 6,530 | 5,770 | 3,990 | 4,510 | 3,200 | 2,440 | 2,750 | 1,900 | 850 | 2,500 |
| Flaws in Work Pieces | ○ | ○ | ○ | ○ | ○ | ○ | ○ | X | Δ | X | — | Δ |

*Outside of the Claimed Invention

EXAMPLE 3

In this example, a combination of a punch made of sintered zirconia-titanium nitride body of the present invention and a cemented carbide punching die as used in Example 1 was used.

Punches were made as follows.

A slurry was prepared by dispersing zirconia powder partially stabilized with $Y_2O_3$ used in Example 1 and titanium nitride having a mean particle diameter of 1.2 $\mu$m in a amount ratio of 70 : 30 in distilled water together with micro wax as a binder in a wet ball mill.

The resulting slurry was spray-dried and a granulated powder was obtained.

The granulated powder was treated in the same manner as in Example 2 and sintered zirconia-titanium nitride bodies having various particle size distributions were obtained.

Punches were prepared using the sintered zirconia-titanium nitride bodies by wire-cutting electrical discharge machining instead of machining with diamond cutter. Using the resulting punches, punching tests were carried out and the results were evaluated in the same manner as in Example 1.

The results and evaluation are shown in Table 3.

Punches were made as follows.

A slurry was prepared by dispersing the zirconia powder partially stabilized with $Y_2O_3$ used in Example 1 and alumina powder used in Example 2 and titanium nitride used in Example 3 in a amount ratio of 50 : 20 : 30 together with micro wax as a binder in distilled water in a wet ball mill.

The resulting slurry was spray-dried and a granulated powder was obtained.

The granulated powder was treated in the manner as in Example 2 and sintered zirconia-alumina-titanium nitride bodies having various particle size distributions were obtained.

Punches were prepared using the sintered zirconia-alumina-titanium nitride bodies by wire cutting electrical discharge machining instead of machining with diamond cutter. Using the resulting punches, tests for punching copper sheets were carried out and particle size distribution was measured in the same manner as in Example 1.

The test results were evaluated in the same manner as in Example 1 and the results and evaluation are shown in Table 4.

TABLE 3

(Sintered Zirconia-TiN Punches)

| No. | 1 | 2 | 3 | 4 | 5 | 6 | 7 | *8 | 9 | *10 | *11 | Control |
|---|---|---|---|---|---|---|---|---|---|---|---|---|
| Mean Particle Diameter ($\mu$m) | 0.7 | 0.7 | 1.3 | 1.5 | 2.0 | 2.1 | 2.4 | 2.4 | 2.6 | 3.6 | 3.5 | Cemented Carbide Punch |
| Particle Diameter at 90% Cumulative Volume Ratio ($\mu$m) | 1.8 | 2.4 | 4.8 | 6.3 | 7.8 | 7.0 | 8.8 | 11.2 | 8.6 | 8.7 | 13.5 | |
| Life (Number of Punching Shots) Unit, Thousands | 12,590 | 12,010 | 9,700 | 9,310 | 8,000 | 8,360 | 5,050 | 2,400 | 2,710 | 1,230 | 640 | 2,500 |
| Flaws in Work Pieces | ○ | ○ | ○ | ○ | ○ | ○ | ○ | X | Δ | X | — | Δ |

*Outside of the Claimed Invention

EXAMPLE 4

In this example, a combination of a punch made of a sintered zirconia-alumina-titanium nitride body of the present invention and a cemented carbide punching die as used in Example 1 was used.

According to Examples 3 and 4, sintered ceramic bodies containing particles of conductive material such as titanium nitride attain greater number of punching shots and thus it is understood that such ceramic bodies attain longer life as punching tools in comparison with other sintered ceramic bodies containing no conductive ceramic particles.

TABLE 4

(Sintered Zirconia-Alumina-TiN Punches)

| No. | 1 | 2 | 3 | 4 | 5 | 6 | 7 | 8 | *9 | 10 | *11 | *12 | Control |
|---|---|---|---|---|---|---|---|---|---|---|---|---|---|
| Mean Particle Diameter ($\mu$m) | 0.6 | 0.5 | 0.8 | 0.8 | 1.3 | 1.7 | 2.3 | 2.5 | 2.4 | 2.6 | 3.1 | 3.6 | Cemented Carbide Punch |
| Particle Diameter at 90% Cumulative Volume Ratio ($\mu$m) | 1.8 | 1.9 | 2.7 | 3.2 | 4.7 | 5.9 | 6.8 | 7.3 | 10.5 | 8.9 | 13.5 | 11.2 | |
| Life (Number of Punching Shots) Unit, Thousands | 10,010 | 11,010 | 8,770 | 8,380 | 5,000 | 4,350 | 3,800 | 3,500 | 2,210 | 2,530 | 1,800 | 950 | 2,500 |
| Flaws in Work Pieces | ○ | ○ | ○ | ○ | ○ | ○ | ○ | ○ | X | Δ | X | — | Δ |

*Outside of the Claimed Invention

EXAMPLE 5

In this example, a combination of a punch made of sintered silicon carbide body of the present invention and a punching die made of a cemented carbide as used in Example 1 was used.

Punches were made as follows.

A slurry was prepared by dispersing a-silicon carbide powder having a mean diameter of 0.3 $\mu$m and boron carbide powder and carbon powder as sintering promoters at a amount ratio of 95 : 4 : 1 together with micro wax as a binder in ethanol.

The resulting slurry was spray-dried and a granulated powder was obtained.

Sintered silicon carbide bodies of a plate shape were prepared in the same manner as in Example 2 except that the granulated powder was calcined at temperatures of 1000–1500° C. and sintered at temperatures of 1850–2100° C.

Punches were prepared using the sintered silicon carbide bodies and particle size distribution was measured in the same manner as in Example 1. Tests of punching copper sheets were carried out.

The test results were evaluated in the same manner as in Example 1 and the results and evaluation are shown in Table 5.

EXAMPLE 6

In this example, a combination of a punch made of a sintered silicon nitride bodies of the present invention and a punching die made of the cemented carbide as used in Example 1 was used.

Punches were made as follows.

A slurry was prepared by dispersing α-silicon nitride powder having a mean particle diameter of 0.7 $\mu$m and MgO and $Yb_2O_3$ as sintering promoters in the ratio of 89 : 3 : 8 together with micro wax as a binder in ethanol.

The resulting slurry was spray-dried and a granulated powder was obtained.

The sintered silicon nitride bodies were prepared in the same manner as in Example 1 except that the calcining temperature was 1000–1500° C. and the sintering temperature was 1550–1950° C.

The resulting sintered silicon nitride bodies were subjected to HIP treatment, that is, they were heat-treated at 1800° C. under the pressure of 1000 atm for 2 hours. Thus final sintered silicon nitride bodies were obtained.

The sintered silicon nitride bodies were formed into punches in the same manner as in Example 1. Punching tests were carried out in the same manner as in Example 1.

The test results were evaluated in the same manner as in Example 1 and results and evaluation are shown in Table 6.

TABLE 5

(Sintered SiC Punches)

| No. | 1 | 2 | 3 | 4 | 5 | *6 | *7 | 8 | *9 | *10 | *11 | Control |
|---|---|---|---|---|---|---|---|---|---|---|---|---|
| Mean Particle Diameter ($\mu$m) | 0.5 | 0.5 | 1.1 | 1.3 | 2.5 | 2.5 | 2.4 | 2.6 | 3.3 | 3.5 | 3.5 | Cemented Carbide Punch |
| Particle Diameter at 90% Cumulative Volume Ratio ($\mu$m) | 0.9 | 1.1 | 3.2 | 4.3 | 8.3 | 10.5 | 11.2 | 8.9 | 12.3 | 9.1 | 13.5 | |
| Life (Number of Punching Shots) Unit, Thousands | 7,700 | 7,450 | 7,020 | 7,150 | 3,280 | 2,490 | 1,900 | 2,610 | 680 | 1,290 | 650 | 2,500 |
| Flaws in Work Pieces | ○ | ○ | ○ | ○ | ○ | X | X | Δ | — | X | — | Δ |

*Outside of the Claimed Invention

TABLE 6

| | (Sintered Silicon Nitride Punches) | | | | | | | |
|---|---|---|---|---|---|---|---|---|
| No. | 1 | 2 | 3 | *4 | 5 | *6 | *7 | Control |
| Mean Particle Diameter ($\mu$m) | 1.1 | 1.1 | 2.5 | 2.7 | 2.7 | 3.5 | 3.6 | Cemented Carbide Punch |
| Particle Diameter at 90% Cumulative Volume Ratio ($\mu$m) | 2.2 | 2.7 | 4.8 | 10.8 | 8.6 | 12.3 | 13.6 | |
| Life (Number of Punching Shots) Unit, Thousands | 8,000 | 8,210 | 4,500 | 2,000 | 2,710 | 1,600 | 1,410 | 2,500 |
| Flaws in Work Pieces | ○ | ○ | ○ | X | Δ | X | X | Δ |

*Outside of the Claimed Invention

EXAMPLE 7

In this example, a combination of a punch made of sintered silicon nitride-silicon carbide bodies of the present invention and a cemented carbide punching die was used.

Punches were made as follows.

A slurry was prepared by dispersing an α-silicon nitride powder having a mean particle diameter of 0.7 $\mu$m, silicon carbide powder having a mean particle diameter of 0.3 $\mu$m and powder of $V_2O_5$ and $Yb_2O_3$ as sintering promoters in a weight ratio of 59 : 35 : 3 : 3 together with micro wax as a binder in ethanol. Silicon nitride is indicated as $Si_3N_4$.

The resulting slurry was spray-dried and a granulated powder was obtained.

Sintered silicon nitride-silicon carbide bodies of a plate shape were prepared in the same manner as in Example 1 except that the calcining temperature was 1000–1500° C. and the sintering temperature was 1850–2000° C.

The resulting sintered silicon nitride-silicon carbide bodies were subjected to HIP treatment, that is, they were heat-treated at 1800° C. under the pressure of 1000 atm for 2 hours. Thus final sintered silicon nitride-silicon carbide bodies were obtained.

The sintered silicon nitride-silicon carbide bodies were formed into punches and the particle size distribution was measured in the same manner as in Example 1. Punching tests were carried out in the same manner as in Example 1.

The test results were evaluated in the same manner as in Example 1 and the results and evaluation are shown in Table 7.

TABLE 7

| | (Sintered-$Si_3N_4$—SiC Punches) | | | | | | | | | |
|---|---|---|---|---|---|---|---|---|---|---|
| No. | 1 | 2 | 3 | 4 | 5 | 6 | *7 | 8 | *9 | Control |
| Mean Particle Diameter ($\mu$m) | 0.5 | 0.5 | 1.3 | 1.7 | 1.7 | 2.1 | 2.2 | 2.4 | 3.3 | Cemented Carbide Punch |
| Particle Diameter at 90% Cumulative Volume Ratio ($\mu$m) | 0.9 | 1.2 | 5.2 | 6.8 | 7.8 | 7.6 | 11.3 | 8.5 | 14.0 | |
| Life (Number of Punching Shots) Unit, Thousands | 8,800 | 7,050 | 4,020 | 3,100 | 2,700 | 3,080 | 2,010 | 2,770 | 250 | 2,500 |
| Flaws in Work Pieces | ○ | ○ | ○ | ○ | Δ | ○ | X | Δ | — | Δ |

*Outside of the Claimed Invention

EXAMPLE 8

In this example, a combination of a punching die made of sintered zirconia bodies of the present invention and a punch of the same cemented carbide as used in Example 1 was used.

Sintered zirconia bodies were prepared in the same manner as in Example 1.

In the same manner as in Example 1, but punching dies were made instead of punches and punching tests were carried out.

The test results were evaluated in the same manner as in Example 1 and results and evaluation are shown in Table 8.

TABLE 8

(Sintered Zirconia Dies)

| No. | 1 | 2 | 3 | 4 | 5 | 6 | 7 | *8 | 9 | *10 | *11 | Control |
|---|---|---|---|---|---|---|---|---|---|---|---|---|
| Mean Particle Diameter ($\mu$m) | 0.3 | 0.4 | 0.8 | 0.8 | 1.6 | 1.6 | 2.3 | 2.5 | 2.6 | 3.3 | 3.8 | Cemented Carbide |
| Particle Diameter at 90% Cumulative Volume Ratio ($\mu$m) | 0.7 | 0.9 | 1.9 | 2.2 | 5.5 | 7.8 | 7.9 | 11.8 | 6.5 | 7.1 | 10.5 | Punching Die |
| Life (Number of Punching Shots) Unit, Thousands | 5,500 | 5,520 | 4,800 | 4,440 | 3,700 | 3,100 | 2,150 | 700 | 1,350 | 980 | 400 | 1,200 |
| Flaws in Work Pieces | ○ | ○ | ○ | ○ | ○ | ○ | ○ | — | Δ | — | — | Δ |

*Outside of the Claimed Invention

EXAMPLE 9

In this example, a combination of a punching die made of sintered alumina-zirconia bodies of the present invention and a punch of the same cemented carbide as used in Example 1 was used.

Sintered alumina-zirconia bodies were prepared in the same manner as in Example 2.

In the same manner as in Example 1, but punching dies were prepared instead of punch and punching tests were carried out.

The test results were evaluated in the same manner as in Example 1 and the results and evaluation are shown in Table 9.

TABLE 9

(Sintered Alumina-Zirconia Dies)

| No. | 1 | 2 | 3 | 4 | 5 | 6 | 7 | *8 | 9 | *10 | *11 | Control |
|---|---|---|---|---|---|---|---|---|---|---|---|---|
| Mean Particle Diameter ($\mu$m) | 0.7 | 0.7 | 1.1 | 1.4 | 2.1 | 2.3 | 2.6 | 2.6 | 2.7 | 3.2 | 3.5 | Cemented Carbide |
| Particle Diameter at 90% Cumulative Volume Ratio ($\mu$m) | 1.9 | 2.7 | 4.3 | 5.8 | 7.7 | 6.5 | 8.9 | 10.8 | 7.9 | 8.7 | 12.8 | Punching Die |
| Life (Number of Punching Shots) Unit, Thousands | 5,550 | 5,610 | 3,400 | 2,900 | 1,890 | 1,720 | 1,440 | 1,000 | 1,280 | 870 | 210 | 1,200 |
| Flaws in Work Pieces | ○ | ○ | ○ | ○ | ○ | ○ | Δ | X | Δ | — | — | Δ |

*Outside of the Claimed Invention

EXAMPLE 10

In this example, a combination of a punching die made of sintered zirconia-titanium nitride body of the present invention and a punch made of the same cemented carbide as used in Example 1 was used.

Sintered zirconia-titanium nitride bodies were prepared in the same manner as in Example 3.

Punching dies instead of punches were prepared in the same manner as in Example 3 and punching tests were carried in the same manner as in Example 1.

The test results were evaluated in the same manner as in Example 1 and the results and evaluation are shown in Table 10.

TABLE 10

(Sintered Zirconia-TiN Dies)

| No. | 1 | 2 | 3 | 4 | 5 | 6 | 7 | *8 | 9 | *10 | *11 | Control |
|---|---|---|---|---|---|---|---|---|---|---|---|---|
| Mean Particle Diameter ($\mu$m) | 0.7 | 0.7 | 1.3 | 1.5 | 2.0 | 2.1 | 2.4 | 2.4 | 2.6 | 3.6 | 3.5 | Cemented Carbide |
| Particle Diameter at | 1.8 | 2.4 | 4.8 | 6.3 | 7.8 | 7.0 | 8.8 | 11.2 | 8.6 | 8.7 | 13.5 | Punching |

TABLE 10-continued (Sintered Zirconia-TiN Dies)

| No. | 1 | 2 | 3 | 4 | 5 | 6 | 7 | *8 | 9 | *10 | *11 | Control |
|---|---|---|---|---|---|---|---|---|---|---|---|---|
| 90% Cumulative Volume Ratio ($\mu$m) | | | | | | | | | | | | Die |
| Life (Number of Punching Shots) United, Thousands | 8,700 | 8,010 | 5,500 | 5,210 | 3,970 | 4,030 | 2,290 | 1,150 | 1,560 | 420 | 110 | 2,500 |
| Flaws in Work Pieces | ○ | ○ | ○ | ○ | ○ | ○ | ○ | X | Δ | — | — | Δ |

*Outside of the Claimed Invention

EXAMPLE 11

In this example, a combination of a punching die made of sintered zirconia-alumina-titanium nitride bodies and a punch made of the same cemented carbide as used in Example 1 was used.

Sintered zirconia-alumina-titanium nitride bodies were prepared in the same manner as in Example 4.

Punching dies instead of punches were prepared in the same manner as in Example 3 and punching tests were carried out in the same manner as in Example 1.

The test results were evaluated in the same manner as in Example 1 and they are shown in Table 11.

According to this example, it is understood that sintered ceramic bodies containing a conductive ceramic particles such as titanium nitride attain larger number of punching shots and provide longer life punching tools in comparison with sintered ceramic bodies containing no conductive ceramic particles.

TABLE 11

(Sintered Zirconia-Alumina-TiN Dies)

| No. | 1 | 2 | 3 | 4 | 5 | 6 | 7 | 8 | *9 | 10 | *11 | *12 | Control |
|---|---|---|---|---|---|---|---|---|---|---|---|---|---|
| Mean Particle Diameter ($\mu$m) | 0.6 | 0.5 | 0.8 | 0.8 | 1.3 | 1.7 | 2.3 | 2.5 | 2.4 | 2.6 | 3.1 | 3.6 | Cemented Carbide |
| Particle Diameter at 90% Cumulative Volume Ratio ($\mu$m) | 1.8 | 1.9 | 2.7 | 3.2 | 4.7 | 5.9 | 6.8 | 7.3 | 10.5 | 8.9 | 13.5 | 11.2 | Punching Die |
| Life (Number of Punching Shots) United, Thousands | 6,010 | 5,700 | 4,710 | 4,100 | 2,790 | 2,230 | 1,780 | 1,500 | 920 | 1,230 | 1,010 | 400 | 1,200 |
| Flaws in Work Pieces | ○ | ○ | ○ | ○ | ○ | ○ | ○ | Δ | — | Δ | X | — | Δ |

*Outside of the Claimed Invention

EXAMPLE 12

In this example, a combination of a punching die made of sintered silicon carbide bodies of the present invention and a punch made of the same cemented carbide as used in Example 1 was used.

Sintered silicon carbide bodies were prepared in the same manner as in Example 5.

Punching dies instead of punches were prepared in the same manner as in Example 3 and punching tests were carried out in the same manner as in Example 1.

The test results were evaluated in the same manner as in Example 1 and the results and evaluation are shown in Table 12.

TABLE 12

(Sintered SiC Dies)

| No. | 1 | 2 | 3 | 4 | 5 | *6 | *7 | 8 | *9 | *10 | *11 | Control |
|---|---|---|---|---|---|---|---|---|---|---|---|---|
| Mean Particle Diameter ($\mu$m) | 0.5 | 0.5 | 1.1 | 1.3 | 2.5 | 2.5 | 2.4 | 2.6 | 3.3 | 3.5 | 3.5 | Cemented Carbide Punching Die |
| Particle Diameter at 90% Cumulative Volume Ratio ($\mu$m) | 0.9 | 1.1 | 3.2 | 4.3 | 8.3 | 10.5 | 11.2 | 8.9 | 12.3 | 9.1 | 13.5 | |
| Life (Number of Punching Shots) United, Thousands | 3,810 | 3,710 | 3,290 | 2,990 | 1,840 | 1,010 | 820 | 1,350 | 110 | 600 | 260 | 1,200 |
| Flaws in Work Pieces | ○ | ○ | ○ | ○ | ○ | X | — | Δ | — | — | — | Δ |

*Outside of the Claimed Invention

EXAMPLE 13

In this example, a combination of a punching die made of sintered silicon nitride bodies of the present invention and a punch of the same cemented carbide as used in Example 1 was used.

Sintered silicon nitride bodies were prepared in the same manner as in Example 6.

Punching dies instead of punches were prepared in the same manner as in Example 3 and punching tests were carried out in the same manner as in Example 1.

The test results were evaluated in the same manner as in Example 1 and the results and evaluation are shown in Table 13.

EXAMPLE 14

In this example, a combination of a punching die made of sintered silicon nitride-silicon carbide bodies of the present invention and a punch made of the same cemented carbide as used in Example 1 was used.

Sintered silicon nitride-silicon carbide bodies were prepared in the same manner as in Example 7.

Punching dies instead of punches were prepared in the same manner as in Example 3 and punching tests were carried out in the same manner as in Example 1.

The test results were evaluated in the same manner as in Example 1 and the results and evaluation are shown in Table 14.

The following examples relate to sintered ceramic bodies comprising insulating ceramic particles whose particle diameter at the cumulative amount ratio of 90% is not larger than 10 $\mu$m and conductive ceramic particles whose mean particle diameter is not larger than 10 $\mu$m with a content ratio of 25–60 vol % of conductive ceramic particles on condition that the total of the insulating ceramic particles and the conductive ceramic particles is 100 vol %.

TABLE 13

(Sintered Silicon Nitride Dies)

| No. | 1 | 2 | 3 | *4 | 5 | *6 | *7 | Control |
|---|---|---|---|---|---|---|---|---|
| Mean Particle Diameter ($\mu$m) | 1.1 | 1.1 | 2.5 | 2.7 | 2.7 | 3.5 | 3.6 | Cemented Carbide Punching Die |
| Particle Diameter at 90% Cumulative Volume Ratio ($\mu$m) | 2.2 | 2.7 | 4.8 | 10.8 | 8.6 | 12.3 | 13.6 | |
| Life (Number of Punching Shots) United, Thousands | 3,500 | 3,750 | 2,220 | 1,080 | 1,340 | 760 | 800 | 1,200 |
| Flaws in Work Pieces | ○ | ○ | ○ | X | Δ | — | — | Δ |

*Outside of the Claimed Invention

TABLE 14

(Sintered Si$_3$N$_4$—SiC Dies)

| No. | 1 | 2 | 3 | 4 | 5 | 6 | *7 | 8 | *9 | Control |
|---|---|---|---|---|---|---|---|---|---|---|
| Mean Particle Diameter ($\mu$m) | 0.5 | 0.5 | 1.3 | 1.7 | 1.7 | 2.1 | 2.2 | 2.4 | 3.3 | Cemented Carbide Punching Die |
| Particle Diameter at 90% Cumulative Volume Ratio ($\mu$m) | 0.9 | 1.2 | 5.2 | 6.8 | 7.8 | 7.6 | 11.3 | 8.5 | 14.0 | |
| Life (Number of Punching Shots) United, Thousands | 5,500 | 5,210 | 3,710 | 1,520 | 1,440 | 1,600 | 1,100 | 1,520 | 90 | 1,200 |

TABLE 14-continued (Sintered Si$_3$N$_4$—SiC Dies)

| No. | 1 | 2 | 3 | 4 | 5 | 6 | *7 | 8 | *9 | Control |
|---|---|---|---|---|---|---|---|---|---|---|
| Flaws in Work Pieces | ○ | ○ | ○ | ○ | ○ | ○ | X | ○ | — | Δ |

*Outside of the Claimed Invention

EXAMPLE 15

Zirconia particles partially stabilized with 3 mol % of Y$_2$O$_3$ having various particle size distributions and particles of TiN, TiC, TiB$_2$, WC, ZrN and NbC having various particle size distribution together with micro wax as a binder were dispersed in ethanol in the ratios indicated in Table 15 in ethanol as dispersion medium in a wet ball mill for 16 hours.

The obtained slurry was spray-dried and a granulated powder was obtained.

The granulated powder was formed into square plates of 75×75×20 mm by applying pressure of 1.5 t/cm$^2$ with a die press. From each mixing composition, 101 plates were prepared. These green compacts were fired under the conditions indicated in Table 15 in a nitrogen atmosphere and thus conductive sintered ceramic bodies were obtained.

One of the thus prepared conductive sintered ceramic bodies was formed into a 3×4×40 mm test piece for the three point bending test. Flexural strength was measured with the conditions of loading rate of 0.5 mm/min and span length of 30 mm at room temperature by the three point bending test based on JIS R1601. After the bending test, the surface of the sintered ceramic body was polished to mirror smoothness and the polished test piece was subjected to the fracture toughness test with a load of 30 kg and a retention time of 15 sec according to the IF method (JIS R1607). The results of the bending strength test and the fracture toughness test are shown in Table 15.

The polished mirror smooth surface of the test piece was subjected to plasma etching and respective particle diameters of the insulating ceramic particles and the conductive ceramic particles were measured by SEM observation. The particle size distribution was determined by the Schwarts-Saltykov method.

The particle diameter at the cumulative amount ratio of 90% of insulating ceramic particles and the mean particle diameter of the conductive ceramic particles were indicated in Table 15.

The remaining 100 test plates were used for evaluation of wire cutting electrical discharge machining property. Specifically, using a die-milling electrical discharge machining apparatus with a copper electrode having a 2 mm diameter, an initial hole 8 was cut through in the plate 9, as shown in FIG. 4. Then a brass wire electrode 10 having a 0.2 mm diameter was placed in the initial hole 8 and the wire cutting electrical discharge machining was carried out. As shown in FIG. 4, the wire cutting electrical discharge machining was conducted along the indicated arrow 11. The length of the wire cutting electrical discharge machining, that is, the length of the movement of the wire, was about 500 mm for one sintered ceramic plate.

The die-milling electrical discharge machinability and wire cutting electrical discharge machinability are shown in Table 15. When all the 100 plates were machined, it was judged that the sintered ceramic body is machinable by die-milling electrical discharge machining and indicated with ○ If even one plate could not be machined by die-milling electrical discharge machining, then it is judged as not machinable by die-milling electrical discharge machining and indicated with X in Table 15. Also in wire cutting electrical discharge machining, if all the 100 plates were machined by wire cutting discharge machining, it is judged as machinable by wire cutting electrical discharge machining and indicated with ○ in Table 15. If even one plate out of 100 plates could not be machined by wire cutting electrical machining, then it is judged that wire cutting electrical machining is impossible and indicated with X in Table 15.

Thermal conductivity of the sintered ceramic bodies was measured in accordance with the laser-flash method of JIS R1611. Hardness of the sintered ceramic bodies was measured in accordance with the Vickers method of JIS R1610. The results are shown in Table 15.

As apparent from the results shown in Table 15, sintered ceramic bodies comprising insulating ceramic particles whose particle diameter at the cumulative amount ratio of 90% is not larger than 10 μm and conductive ceramic particles whose mean particle diameter is not larger than 10 μm in a content ratio of 25–60 vol % of conductive ceramic particles on condition that the total of the insulating ceramic particles and the conductive ceramic particles is 100 vol % are machinable by both die-milling electrical discharge machining and wire cutting electrical discharge machining and have good mechanical properties such as bending strength. Further, they are excellent in the thermal conductivity and the hardness.

Further review of Table 15 reveals the following facts. When the content of conductive ceramic particles is less than 25 vol %, wire cutting electrical discharge machining is impossible. When it exceeds 60 vol %, mechanical strength, especially bending strength is poor and the sintered ceramic bodies cannot be practically used. When the particle diameter at the cumulative amount ratio of 90% of insulating ceramic particles is in excess of 10 μm, breaking of wire electrode may occur during wire cutting electrical discharge machining. When the mean particle diameter of the conductive ceramic particles is in excess of 10 μm, the bending strength of the sintered ceramic bodies may drop.

TABLE 15

| Example | *1 | *2 | 3 | 4 | 5 | *6 | 7 | 8 | 9 | *10 | 11 | *12 |
|---|---|---|---|---|---|---|---|---|---|---|---|---|
| Composition (vol %) | | | | | | | | | | | | |
| Insulating Particles | | | | | | | | | | | | |
| ZrO$_2$ | 85 | 80 | 75 | 75 | 75 | 75 | 70 | 70 | 70 | 70 | 60 | 60 |
| Particle Diameter at 90% Cumulative Volume Ratio ($\mu$m) | 0.8 | 12.0 | 0.9 | 0.8 | 0.8 | 1.0 | 0.8 | 0.9 | 8.5 | 12.0 | 0.9 | 1.9 |
| Conductive Particles | 15 (TiN) | 20 (TiC) | 25 (TiB$_2$) | 25 (TiN) | 25 (TiC) | 25 (TiC) | 30 (WC) | 30 (TiN) | 30 (TiN) | 30 (TiN) | 40 (TiC) | 40 (TiC) |
| Mean Particle Diameter at 50% Cumulative Volume Ratio ($\mu$m) | 1.5 | 1.3 | 1.1 | 1.5 | 1.3 | 14.0 | 0.9 | 1.5 | 1.5 | 1.5 | 1.3 | 14.0 |
| Sintering Condition | | | | | | | | | | | | |
| Sintering Temperature at Normal Pressure (° C.) | 1500 | 1600 | 1580 | 1500 | 1500 | 1600 | 1520 | 1520 | 1620 | 1600 | 1550 | 1620 |
| Temperature of HIP Treatment (° C.) | 1450 | 1450 | 1550 | 1450 | 1450 | 1450 | 1450 | 1450 | 1550 | 1450 | 1450 | 1500 |
| Bending Strength (MP$_a$) | 1630 | 870 | 1550 | 1580 | 1530 | 830 | 1610 | 1590 | 1360 | 800 | 1500 | 690 |
| Fracture Tonghness (MP$_a$ · m$^{1/2}$) | 7.3 | 7.9 | 6.4 | 6.7 | 6.0 | 7.0 | 6.1 | 6.4 | 5.7 | 6.1 | 5.8 | 6.0 |
| Diemilling Electrical Discharge Machinability | X | ◯ | ◯ | ◯ | ◯ | ◯ | ◯ | ◯ | ◯ | ◯ | ◯ | ◯ |
| Wire Cutting Electrical Discharge Machinability | X | X | ◯ | ◯ | ◯ | ◯ | ◯ | ◯ | ◯ | X | ◯ | ◯ |
| Thermal Conductivity (w/m · k) | 6 | 7 | 8 | 8 | 9 | 9 | 28 | 9 | 9 | 9 | 12 | 12 |
| Hardness (Hv) | 1390 | 1670 | 1800 | 1450 | 1760 | 1760 | 1420 | 1480 | 1480 | 1480 | 2040 | 2040 |

| Example | 13 | 14 | *15 | 16 | 17 | *18 | 19 | 20 | 21 | *22 | *23 |
|---|---|---|---|---|---|---|---|---|---|---|---|
| Composition (vol %) | | | | | | | | | | | |
| Insulating Particles | | | | | | | | | | | |
| ZrO$_2$ | 50 | 50 | 50 | 50 | 45 | 45 | 45 | 40 | 40 | 40 | 35 |
| Particle Diameter at 90% Cumulative Volume Ratio ($\mu$m) | 1.5 | 1.0 | 12.0 | 0.8 | 1.2 | 0.8 | 0.8 | 2.2 | 1.6 | 1.6 | 2.3 |
| Conductive Particles | 50 (ZrN) | 50 (TiC) | 50 (TiC) | 50 (TiC) | 55 (TiN) | 55 (TiN) | 55 (TiC) | 60 (NbC) | 60 (TiN) | 60 (TiN) | 65 (TiN) |
| Mean Particle Diameter at 50% Cumulative Volume Ratio ($\mu$m) | 1.1 | 1.3 | 1.3 | 9.1 | 1.5 | 11.0 | 1.3 | 1.1 | 1.5 | 11.0 | 1.5 |
| Sintering Condition | | | | | | | | | | | |
| Sintering Temperature at Normal Pressure (° C.) | 1600 | 1550 | 1620 | 1550 | 1570 | 1620 | 1570 | 1650 | 1620 | 1620 | 1650 |
| Temperature of HIP Treatment (° C.) | 1500 | 1450 | 1500 | 1450 | 1500 | 1500 | 1500 | 1600 | 1500 | 1500 | 1550 |
| Bending Strength (MP$_a$) | 1280 | 1470 | 820 | 1220 | 1420 | 620 | 1440 | 1270 | 1360 | 520 | 730 |
| Fracture Tonghness (MP$_a$ · m$^{1/2}$) | 6.1 | 5.7 | 6.3 | 6.0 | 6.3 | 6.1 | 5.9 | 5.8 | 5.7 | 6.1 | 5.5 |
| Diemilling Electrical Discharge Machinability | ◯ | ◯ | ◯ | ◯ | ◯ | ◯ | ◯ | ◯ | ◯ | ◯ | ◯ |
| Wire Cutting Electrical Discharge Machinability | ◯ | ◯ | X | ◯ | ◯ | ◯ | ◯ | ◯ | ◯ | ◯ | ◯ |
| Thermal Conductivity (w/m · k) | 14 | 14 | 14 | 14 | 15 | 15 | 15 | 16 | 16 | 16 | 17 |
| Hardness (Hv) | 1740 | 2220 | 2220 | 2220 | 1640 | 1640 | 2310 | 1820 | 1670 | 1670 | 1700 |

*Outside of the Claimed Invention

EXAMPLE 16

Zirconia particles partially stabilized with 3 mol % of Y$_2$O$_3$ having various particle size distributions and particles of high purity alumina having various particle size distributions were mixed in weight ratio of 80 : 20 and the obtained mixture and particles of TiN, TiC, TiB$_2$, WC, ZrN and NbC having various particle size distributions were mixed in mixing ratios indicated in Table 16 in the same manner as in Example 15 and slurries was obtained in the same manner as in Example 15. The slurries were dried in the same manner as in Example 15 and green materials were obtained.

Conductive sintered ceramic bodies were prepared from this green material in the same manner as in Example 15.

In the same manner as in Example 15, bending strength and fracture strength and particle size distribution of the sintered ceramic bodies. The particle diameter at the cumulative amount ratio of 90% of the insulating ceramic particles and the mean particle diameter of the conductive ceramic particles were determined. The thermal conductivity and the hardness were also measured. The results are indicated in Table 16.

Machinability of these conductive sintered ceramic bodies in die-milling and wire cutting electrical discharge machining was evaluated in the same manner as in Example 15 and the results are shown in Table 16.

As apparent from Table 16, when the content of the conductive ceramic particles is in the range of 25–60 vol %, wire cutting electrical discharge machining can be stably carried out. When the conductive ceramic particle content is in excess of 60 vol %, bending strength of the sintered conductive ceramic body falls.

When the particle diameter of the insulating ceramic particles at the cumulative amount ratio of 90% is in excess of 10 μm, wire electrode may be broken during wire cutting electrical discharge machining and when the mean particle diameter is in excess of 10 μm, the bending strength of the sintered body falls.

Sintered ceramic bodies comprising insulating ceramic particles whose particle diameter at the cumulative amount ratio of 90% is not larger than 10 μm and conductive ceramic particles whose mean particle diameter is not larger than 10 μm in a content ratio of 25–60 vol % of conductive ceramic particles on condition that the total of the insulating ceramic particles and the conductive ceramic particles is 100 vol % are excellent in bending strength and fracture toughness, and machinable by both die-milling electrical discharge machining and wire cutting electrical discharge machining. These sintered ceramic bodies have good thermal conductivity and high hardness. Thus metal working tools made of the sintered ceramic bodies less suffer breakage due to heat produced during a work when they are used in combination with other members, which have a thermal conductivity being different from that of the sintered ceramic bodies. Such metal working tools less suffer breakage due to mechanical contact in working.

The following examples relate to sintered ceramic bodies, which comprises insulating ceramic particles whose particle diameter at the cumulative amount ratio of 90% is not larger than 10 μm and conductive ceramic particles whose mean particle diameter is 0.3–10 μm, wherein the ratio of (ε) of the mean particle diameter (dm) of insulating ceramic particles to the mean particle diameter (dsp) cf the conductive ceramic particles (ε=dsp/dm) is not larger than 9 and the content of the conductive ceramic particles is 25–60 vol % when the total amount of the conductive ceramic particles and the insulating particles is 100 Vol %.

TABLE 16

| Example | *1 | *2 | 3 | 4 | 5 | *6 | 7 | 8 | 9 | *10 | 11 | *12 |
|---|---|---|---|---|---|---|---|---|---|---|---|---|
| Composition (vol %) | | | | | | | | | | | | |
| Insulating Particles 80% $ZrO_2$ + 20% $Al_2O_2$ | 85 | 80 | 75 | 75 | 75 | 75 | 70 | 70 | 70 | 70 | 60 | 60 |
| Particle Diameter at 90% Cumulative Volume Ratio (μm) | 1.2 | 12.9 | 1.3 | 1.2 | 1.2 | 2.8 | 1.2 | 1.6 | 8.5 | 12.0 | 1.6 | 2.9 |
| Conductive Particles | 15 (TiN) | 20 (TiC) | 25 ($TiB_2$) | 25 (TiN) | 25 (TiC) | 25 (TiC) | 30 (WC) | 30 (TiN) | 30 (TiN) | 30 (TiN) | 40 (TiC) | 40 (TiC) |
| Mean Particle Diameter at 50% Cumulative Volume Ratio (μm) | 1.5 | 1.3 | 1.1 | 1.5 | 1.3 | 14.0 | 0.9 | 1.5 | 1.5 | 1.5 | 1.3 | 14.1 |
| Sintering Condition | | | | | | | | | | | | |
| Sintering Temperature at Normal Pressure (° C.) | 1500 | 1600 | 1580 | 1500 | 1500 | 1600 | 1520 | 1520 | 1620 | 1600 | 1550 | 1620 |
| Temperature of HIP Treatment (° C.) | 1500 | 1450 | 1550 | 1450 | 1450 | 1450 | 1450 | 1450 | 1550 | 1450 | 1450 | 1500 |
| Bending Strength (MP$_a$) | 1630 | 620 | 1480 | 1570 | 1630 | 730 | 1680 | 1580 | 1260 | 720 | 1380 | 420 |
| Fracture Tonghness (MP$_a$ · m$^{1/2}$) | 6.4 | 6.7 | 5.5 | 5.8 | 5.1 | 6.2 | 5.0 | 5.3 | 4.9 | 5.5 | 4.8 | 4.8 |
| Diemilling Electrical Discharge Machinability | X | ◯ | ◯ | ◯ | ◯ | ◯ | ◯ | ◯ | ◯ | ◯ | ◯ | ◯ |
| Wire Cutting Electrical Discharge Machinability | X | X | ◯ | ◯ | ◯ | ◯ | ◯ | ◯ | ◯ | X | ◯ | ◯ |
| Thermal Conductivity (w/m · k) | 9 | 10 | 11 | 11 | 11 | 11 | 31 | 12 | 12 | 13 | 14 | 14 |
| Hardness (Hv) | 1560 | 1830 | 1950 | 1600 | 1910 | 1910 | 1560 | 1620 | 1620 | 1620 | 2160 | 2160 |

| Example | 13 | 14 | *15 | 16 | 17 | *18 | 19 | 20 | 21 | *22 | *23 |
|---|---|---|---|---|---|---|---|---|---|---|---|
| Composition (vol %) | | | | | | | | | | | |
| Insulating Particles 80% $ZrO_2$ + 20% $Al_2O_2$ | 50 | 50 | 50 | 50 | 45 | 45 | 45 | 40 | 40 | 40 | 35 |
| Particle Diameter at 90% Cumulative Volume Ratio (μm) | 2.5 | 3.0 | 11.2 | 1.2 | 1.3 | 1.2 | 1.2 | 2.9 | 3.6 | 3.6 | 4.3 |
| Conductive Particles | 50 (ZrN) | 50 (TiC) | 50 (TiC) | 50 (TiC) | 55 (TiN) | 55 (TiN) | 55 (TiC) | 60 (NbC) | 60 (TiN) | 60 (TiN) | 65 (TiN) |
| Mean Particle Diameter at 50% Cumulative Volume Ratio (μm) | 1.1 | 1.3 | 1.3 | 9.1 | 1.5 | 11.4 | 1.3 | 1.1 | 1.5 | 11.4 | 1.5 |
| Sintering Condition | | | | | | | | | | | |
| Sintering Temperature at Normal Pressure (° C.) | 1600 | 1550 | 1620 | 1550 | 1570 | 1620 | 1570 | 1650 | 1620 | 1620 | 1550 |
| Temperature of HIP Treatment (° C.) | 1500 | 1450 | 1500 | 1450 | 1500 | 1500 | 1500 | 1600 | 1500 | 1500 | 1550 |
| Bending Strength (MP$_a$) | 1180 | 1400 | 590 | 1170 | 1380 | 480 | 1390 | 1090 | 1190 | 390 | 510 |
| Fracture Tonghness (MP$_a$ · m$^{1/2}$) | 5.2 | 5.1 | 5.5 | 4.9 | 5.4 | 5.2 | 5.2 | 4.5 | 4.5 | 5.0 | 4.0 |
| Diemilling Electrical Discharge Machinability | ◯ | ◯ | ◯ | ◯ | ◯ | ◯ | ◯ | ◯ | ◯ | ◯ | ◯ |
| Wire Cutting Electrical Discharge Machinability | ◯ | ◯ | X | ◯ | ◯ | ◯ | ◯ | ◯ | ◯ | ◯ | ◯ |

TABLE 16-continued

| | | | | | | | | | | | |
|---|---|---|---|---|---|---|---|---|---|---|---|
| Thermal Conductivity (W/m · k) | 16 | 16 | 16 | 16 | 16 | 16 | 17 | 17 | 17 | 17 | 18 |
| Hardness (Hv) | 1840 | 2320 | 2320 | 2320 | 1730 | 1730 | 2402 | 1900 | 1750 | 1750 | 1770 |

*Outside of the Claimed Invention

EXAMPLE 17

Zirconia powders partially stabilized with 3 mol % of $Y_2O_3$ having various mean particle diameters (dm) of and titanium nitride powders having various mean particle diameters (dsp), as shown in Table 17, were prepared.

The zirconia powders and titanium nitride powders are respectively mixed in ratios ($\epsilon$) indicated in Table 17 and in compositions indicated in Table 18 together with micro wax as a binder in distilled water as a dispersion medium in a wet ball mill.

The obtained slurries were spray-dried and granulated powders were obtained.

Sintered zirconia-titanium nitride bodies were obtained in the same manner as in Example 1 except that the calcining temperature was 800–1200° C. and the sintering temperature was 1350–1650° C.

The resulting sintered zirconia-titanium nitride bodies were subjected to HIP treatment, that is, they were treated at 1500° C. under the pressure of 1000 atm for 2 hours. Thus final zirconia-titanium nitride bodies were obtained.

Specific resistivities of these sintered zirconia-titanium nitride bodies were measured by the four terminal method as described in JIS C2561. The results are shown in Table 18.

In Table 18, E+0 means $10^0$, E+8 means $10^8$ for instance and the other indications mean the same.

TABLE 17

Mean Particle Diameter of Zirconia (dm), Mean Particle Diameter of Titanium Nitride (dsp) and the Ratio ($\epsilon$) ($\epsilon$ = dsp/dm)

| dsp | 0.40 | 1.40 | 2.50 | 3.00 |
|---|---|---|---|---|
| dm 0.15 | $\epsilon$ = 2.67 | $\epsilon$ = 9.33 | $\epsilon$ = 16.67 | $\epsilon$ = 20.00 |
| 0.25 | $\epsilon$ = 1.60 | $\epsilon$ = 5.60 | $\epsilon$ = 10.00 | $\epsilon$ = 12.00 |

TABLE 17-continued

Mean Particle Diameter of Zirconia (dm), Mean Particle Diameter of Titanium Nitride (dsp) and the Ratio ($\epsilon$) ($\epsilon$ = dsp/dm)

| dsp | 0.40 | 1.40 | 2.50 | 3.00 |
|---|---|---|---|---|
| 0.10 | $\epsilon$ = 0.57 | $\epsilon$ = 2.00 | $\epsilon$ = 3.57 | $\epsilon$ = 4.29 |
| 1.10 | $\epsilon$ = 0.36 | $\epsilon$ = 1.27 | $\epsilon$ = 2.27 | $\epsilon$ = 2.13 |
| 1.45 | $\epsilon$ = 0.28 | $\epsilon$ = 0.97 | $\epsilon$ = 1.72 | $\epsilon$ = 2.07 |

TABLE 18

Electric Resistivity ($\Omega$ · cm)

| | TiN Content (Vol %) | 20 | 25 | 30 | 40 | 50 | 55 | 60 | 65 |
|---|---|---|---|---|---|---|---|---|---|
| $\epsilon$ | 0.28 | 2.5 E + 8 | 3.4 E + 0 | 2.3 E − 3 | 1.1 E − 3 | 9.2 E − 4 | 8.4 E − 4 | 5.4 E − 4 | 4.9 E − 4 |
| | 0.36 | 2.4 E + 8 | 3.4 E + 0 | 3.5 E − 3 | 1.2 E − 3 | 9.2 E − 4 | 8.4 E − 4 | 5.4 E − 4 | 4.9 E − 4 |
| | 0.57 | 2.4 E + 8 | 3.6 E + 0 | 2.6 E − 3 | 1.1 E − 3 | 9.2 E − 4 | 8.5 E − 4 | 5.4 E − 4 | 4.9 E − 4 |
| | 0.97 | 2.5 E + 8 | 3.5 E + 0 | 2.5 E − 3 | 1.3 E − 3 | 9.3 E − 4 | 8.4 E − 4 | 5.5 E − 4 | 5.0 E − 4 |
| | 1.27 | 2.5 E + 8 | 3.4 E + 0 | 2.5 E − 3 | 1.2 E − 3 | 9.4 E − 4 | 8.6 E − 4 | 5.5 E − 4 | 4.9 E − 4 |
| | 1.60 | 2.6 E + 8 | 3.5 E + 0 | 2.7 E − 3 | 1.2 E − 3 | 9.3 E − 4 | 8.6 E − 4 | 5.5 E − 4 | 4.9 E − 4 |
| | 1.72 | 2.7 E + 8 | 3.7 E + 0 | 2.7 E − 3 | 1.3 E − 3 | 9.4 E − 4 | 8.6 E − 4 | 5.6 E − 4 | 4.9 E − 4 |
| | 2.00 | 2.7 E + 8 | 3.6 E + 0 | 2.8 E − 3 | 1.3 E − 3 | 9.4 E − 4 | 8.6 E − 4 | 5.6 E − 4 | 5.0 E − 4 |
| | 2.07 | 2.6 E + 8 | 3.6 E + 0 | 2.8 E − 3 | 1.4 E − 3 | 9.4 E − 4 | 8.7 E − 4 | 5.8 E − 4 | 5.1 E − 4 |
| | 2.27 | 2.8 E + 8 | 3.8 E + 0 | 2.9 E − 3 | 1.4 E − 3 | 9.4 E − 4 | 8.6 E − 4 | 5.6 E − 4 | 5.1 E − 4 |
| | 2.67 | 2.7 E + 8 | 3.7 E + 0 | 2.8 E − 3 | 1.5 E − 3 | 9.5 E − 4 | 8.7 E − 4 | 5.6 E − 4 | 5.0 E − 4 |
| | 2.73 | 2.7 E + 8 | 3.8 E + 0 | 2.8 E − 3 | 1.5 E − 3 | 9.4 E − 4 | 8.6 E − 4 | 5.7 E − 4 | 5.1 E − 4 |
| | 3.57 | 2.8 E + 8 | 3.8 E + 0 | 3.0 E − 3 | 1.5 E − 3 | 9.4 E − 4 | 8.6 E − 4 | 5.7 E − 4 | 5.1 E − 4 |
| | 4.29 | 2.9 E + 8 | 3.9 E + 0 | 3.0 E − 3 | 1.4 E − 3 | 9.5 E − 4 | 8.7 E − 4 | 5.7 E − 4 | 5.0 E − 4 |
| | 5.60 | 2.9 E + 8 | 3.8 E + 0 | 3.0 E − 3 | 1.4 E − 3 | 9.4 E − 4 | 8.7 E − 4 | 5.8 E − 4 | 5.1 E − 4 |
| | 9.33 | 3.5 E + 8 | 4.4 E + 0 | 3.9 E − 3 | 2.0 E − 3 | 9.6 E − 4 | 8.7 E − 4 | 5.7 E − 4 | 5.1 E − 4 |
| | 10.00 | 3.9 E + 8 | 4.7 E + 0 | 4.4 E − 3 | 2.1 E − 3 | 9.7 E − 4 | 8.7 E − 4 | 5.8 E − 4 | 5.2 E − 4 |

These sintered zirconia-titanium nitride bodies were subjected to wire cutting electrical discharge machining and the surface roughness (Ra) of the worked bodies was measured with a surface roughness measurement apparatus marketed by Rank Tailor Hobson, Inc. The results are shown in Table 19.

As shown in Table 19, the sintered ceramic bodies within the scope of the present invention have the surface roughness Ra of not larger than 2 $\mu$m and, therefore, they can be used as metal working tools without polishing the surface to mirror smoothness.

TABLE 19

Surface Roughness Ra ($\mu$m)

| | TiN Content (Vol %) | 20 | | 25 | 30 | 40 | 50 | 55 | 60 | 65 |
|---|---|---|---|---|---|---|---|---|---|---|
| $\epsilon$ | 0.28 | Electric Discharge Impossible | | 1.1 | 0.9 | 0.9 | 0.8 | 0.9 | 1.0 | 1.0 |
| | 0.36 | Electric Discharge Impossible | | 1.3 | 1.1 | 1.1 | 1.1 | 1.2 | 1.2 | 1.1 |
| | 0.57 | Electric Discharge Impossible | | 1.3 | 1.2 | 1.2 | 1.1 | 1.1 | 1.2 | 1.1 |
| | 0.97 | Electric Discharge Impossible | | 1.2 | 1.0 | 1.0 | 0.9 | 1.1 | 1.1 | 1.0 |

TABLE 19-continued

| | Surface Roughness Ra ($\mu$m) | | | | | | | |
|---|---|---|---|---|---|---|---|---|
| TiN Content (Vol %) | 20 | 25 | 30 | 40 | 50 | 55 | 60 | 65 |
| 1.27 | Electric Discharge Impossible | 1.4 | 1.3 | 1.3 | 1.4 | 1.4 | 1.4 | 1.3 |
| 1.60 | Electric Discharge Impossible | 1.0 | 0.8 | 0.9 | 0.8 | 0.9 | 0.8 | 0.9 |
| 1.72 | Electric Discharge Impossible | 1.8 | 1.6 | 1.6 | 1.8 | 1.8 | 1.7 | 1.7 |
| 2.00 | Electric Discharge Impossible | 1.5 | 1.3 | 1.2 | 1.2 | 1.3 | 1.4 | 1.4 |
| 2.07 | Electric Discharge Impossible | 1.9 | 1.8 | 1.9 | 1.8 | 1.9 | 1.9 | 1.9 |
| 2.27 | Electric Discharge Impossible | 2.0 | 1.9 | 2.0 | 1.9 | 2.0 | 2.0 | 1.9 |
| 2.67 | Electric Discharge Impossible | 1.7 | 1.5 | 1.4 | 1.4 | 1.5 | 1.6 | 1.6 |
| 2.73 | Electric Discharge Impossible | 2.0 | 2.0 | 1.9 | 1.9 | 2.0 | 1.9 | 2.0 |
| 3.57 | Electric Discharge Impossible | 2.0 | 2.0 | 1.9 | 1.9 | 2.0 | 2.0 | 2.0 |
| 4.29 | Electric Discharge Impossible | 1.9 | 1.9 | 2.0 | 2.0 | 2.0 | 2.0 | 2.0 |
| 5.60 | Electric Discharge Impossible | 1.9 | 1.9 | 1.9 | 2.0 | 2.0 | 2.0 | 2.0 |
| 9.33 | Electric Discharge Impossible | 3.7 | 3.6 | 3.5 | 3.4 | 3.5 | 3.5 | 3.4 |
| 10.00 | Electric Discharge Impossible | 4.9 | 4.7 | 4.6 | 4.8 | 4.6 | 4.6 | 4.5 |

EXAMPLE 18

Zirconia powders partially stabilized with 3 mol % of $Y_2O_3$ having various mean particle diameters (d 50%) and various particle diameters at the cumulative amount ratio of 90% (d 90%) indicated in Table 20 were mixed with titanium nitride having various mean particle diameters (d 50%) indicated in Table 20 so that the content ratio of the latter was 30 vol % together with micro wax as a binder in distilled water as a dispersion medium in a wet ball mill.

From the resulting slurries, sintered zirconia-titanium nitride bodies were obtained in the same manner as in Example 17.

Bending strength of these zirconia-titanium nitride bodies was measured in accordance with JIS R1601. The results are shown in Table 20.

These zirconia-titanium nitride bodies were subjected to wire cutting electrical discharge machining and machinability thereby was evaluated in the same matter as in Example 15. The results are shown in Table 20.

Punches as shown in FIG. 2 were made of the zirconia-titanium nitride bodies by wire cutting electrical machining. Using these punches and cemented carbide punching dies punching tests were carried out in the same manner as in Example 1. The results are shown in Table 20.

TABLE 20

Properties of Sintered Ceramic Bodies Containing 30 vol % Titanium Nitride

| Particle Size of Zirconia | | | | | | | | | | | | | | | |
|---|---|---|---|---|---|---|---|---|---|---|---|---|---|---|---|
| d 50% | 0.25 | 0.25 | 0.25 | 0.25 | 0.25 | 1.1 | 1.1 | 1.1 | 1.1 | 1.1 | 2.5 | 2.5 | 2.5 | 2.5 | 2.5 |
| d 90% | 0.81 | 0.81 | 0.81 | 0.81 | 0.81 | 0.21 | 0.21 | 0.21 | 0.21 | 0.21 | 6.3 | 6.3 | 6.3 | 6.3 | 6.3 |
| Titanium Nitride d 50% | 0.25 | 0.4 | 1.4 | 8.5 | 11.5 | 0.25 | 0.4 | 1.4 | 8.5 | 11.5 | 0.25 | 0.4 | 1.4 | 8.5 | 11.5 |
| Bending Strength (MP$_a$) | 910 | 1520 | 1590 | 1500 | 870 | 950 | 1550 | 1550 | 1510 | 880 | 850 | 1480 | 1500 | 1470 | 790 |
| Diemilling Electrical Discharge Machinability | ○ | ○ | ○ | ○ | ○ | ○ | ○ | ○ | ○ | ○ | ○ | ○ | ○ | ○ | ○ |
| Wire Cutting Electrical Discharge Machinability | ○ | ○ | ○ | ○ | ○ | ○ | ○ | ○ | ○ | ○ | ○ | ○ | ○ | ○ | ○ |
| Life (Number of Punching Shots) Unit, Thousands | 2,400 | 12,500 | 12,600 | 12,200 | 2,300 | 2,200 | 12,600 | 12,400 | 12,900 | 2,100 | 2,200 | 12,200 | 12,200 | 12,000 | 2,000 |

| Particle Size of Zirconia | | | | | | | | | | | |
|---|---|---|---|---|---|---|---|---|---|---|---|
| d 50% | | 3.6 | 3.6 | 3.6 | 3.6 | 3.6 | 4.8 | 4.8 | 4.8 | 4.8 | 4.8 | Control: Cemented Carbide Punch |
| d 90% | | 8.9 | 8.9 | 8.9 | 8.9 | 8.9 | 10.8 | 10.8 | 10.8 | 10.8 | 10.8 | |
| Titanium Nitride d 50% | | 0.25 | 0.4 | 1.4 | 8.5 | 11.5 | 0.25 | 0.4 | 1.4 | 8.5 | 11.5 | |
| Bending Strength (MP$_a$) | | 770 | 1440 | 1390 | 1350 | 660 | 720 | 1380 | 1390 | 1360 | 690 | |
| Diemilling Electrical Discharge Machinability | | ○ | ○ | ○ | ○ | ○ | ○ | ○ | ○ | ○ | ○ | |
| Wire Cutting Electrical Discharge Machinability | | ○ | ○ | ○ | ○ | ○ | ○ | ○ | ○ | ○ | ○ | |
| Life (Number of Punching Shots) Unit, Thousands | | 1,800 | 12,000 | 11,800 | 11,700 | 1,600 | 1,900 | 12,900 | 12,200 | 11,800 | 2,000 | 2,500 |

EXAMPLE 19

The procedures of Example 18 were repeated except that the titanium nitride content was 50 vol % instead of 30 vol % and punches and punching dies were prepared. Bending strength, machinability in wire cutting and die-milling electrical discharged machining were measured. Also tool life was measured by punching test. The results are shown in Table 21.

TABLE 21

Properties of Sintered Ceramic Bodies Containing 50 vol % Titanium Nitride

| Particle Size of Zirconia | | | | | | | | | | | | | | | |
|---|---|---|---|---|---|---|---|---|---|---|---|---|---|---|---|
| d 50% | 0.22 | 0.22 | 0.22 | 0.22 | 0.22 | 0.9 | 0.9 | 0.9 | 0.9 | 0.9 | 2.3 | 2.3 | 2.3 | 2.3 | 2.3 |
| d 90% | 0.78 | 0.78 | 0.78 | 0.78 | 0.78 | 1.9 | 1.9 | 1.9 | 1.9 | 1.9 | 6.2 | 6.2 | 6.2 | 6.2 | 6.2 |
| Titanium Nitride d 50% | 0.25 | 0.4 | 1.4 | 8.5 | 11.5 | 0.25 | 0.4 | 1.4 | 8.5 | 11.5 | 0.25 | 0.4 | 1.4 | 8.5 | 11.5 |
| Bending Strength (MP$_a$) | 860 | 1510 | 1500 | 1440 | 790 | 870 | 1470 | 1470 | 1430 | 810 | 850 | 1490 | 1470 | 1410 | 710 |
| Diemilling Electrical Discharge Machinability | ○ | ○ | ○ | ○ | ○ | ○ | ○ | ○ | ○ | ○ | ○ | ○ | ○ | ○ | ○ |
| Wire Cutting Electrical Discharge Machinability | ○ | ○ | ○ | ○ | ○ | ○ | ○ | ○ | ○ | ○ | ○ | ○ | ○ | ○ | ○ |
| Life (Number of Punching Shots) Unit, Thousands | 2,400 | 12,000 | 11,800 | 12,100 | 2,400 | 2,300 | 12,500 | 12,600 | 12,100 | 2,100 | 2,200 | 12,500 | 12,500 | 12,500 | 2,000 |

| Particle Size of Zirconia | | | | | | | | | | | |
|---|---|---|---|---|---|---|---|---|---|---|---|
| d 50% | 3.3 | 3.3 | 3.3 | 3.3 | 3.3 | 4.4 | 4.4 | 4.4 | 4.4 | 4.4 | Control: Cemented Carbide Punch |
| d 90% | 8.7 | 8.7 | 8.7 | 8.7 | 8.7 | 10.5 | 10.5 | 10.5 | 10.5 | 10.5 | |
| Titanium Nitride d 50% | 0.25 | 0.4 | 1.4 | 8.5 | 11.5 | 0.25 | 0.4 | 1.4 | 8.5 | 11.5 | |
| Bending Strength (MP$_a$) | 720 | 1420 | 1410 | 1400 | 690 | 660 | 1330 | 1350 | 1310 | 620 | |
| Diemilling Electrical Discharge Machinability | ○ | ○ | ○ | ○ | ○ | ○ | ○ | ○ | ○ | ○ | |
| Wire Cutting Electrical Discharge Machinability | ○ | ○ | ○ | ○ | ○ | ○ | ○ | ○ | ○ | ○ | |
| Life (Number of Punching Shots) Unit, Thousands | 1,800 | 11,900 | 12,100 | 11,700 | 1,700 | 1,900 | 11,600 | 11,700 | 11,500 | 2,000 | 2,500 |

From the results shown in Table 20 and 21, it is apparent that with the titanium nitride content of less than 25 vol %, zirconia-titanium nitride sintered bodies cannot be worked by wire cutting electrical discharge machining; when the mean particle diameter of the conductive ceramic particles is in the range of 0.3–10 μm and the particle diameter of the insulating ceramic particles at the cumulative amount ratio of 90 μm is 10 μm at the largest, sintered ceramic bodies can be prepared, which have good bending strength, machinability in wire cutting and die-milling electrical discharge machining, from which long life punching tools can be manufactured.

The metal working tool made of the sintered ceramic bodies within the scope of the present invention does not cause staining of work pieces. That is, lead frames are not contaminated and, therefore, semi-conductor chips does not suffer any undesirable influence.

EFFECT OF THE INVENTION

According to the present invention, sintered ceramic bodies which can be worked by both wire cutting and die-milling electrical discharge machinings and have excellent mechanical strengths are provided. According to the present invention, sintered ceramic bodies which have high mechanical strength and can be worked into ceramic tools which have long life and scarcely cause flaws in work pieces as well as a process for preparing such sintered ceramic bodies are provided. According to the present invention, sintered ceramic tools which have smooth surface, are shapable by electrical discharge machining, have long life in die working and a process for preparing such tools are provide.

What we claim is:

1. A sintered ceramic body comprising insulating ceramic particles and electrically conductive particles, wherein the particle diameter of the insulating ceramic particles at a cumulative amount ratio of 90% is not larger than 10 μm and the mean particle diameter of the electrically conductive ceramic particles is not larger than 10 μm, and the content of the electrically conductive ceramic particles is 25–60 vol % when the total of the conductive ceramic particles and the insulating ceramic particles is 100 vol %.

2. The sintered ceramic body as claimed in claim 1, wherein the ratio (ε) of the mean particle diameter of the insulating ceramic particles (dm) to the mean particle diameter of conductive ceramic particles (dsp) is not larger than 9.

3. The sintered ceramic body as claimed in claim 1, wherein the mean particle diameter of the conductive ceramic particles is 0.3–10 μm.

4. The sintered ceramic body as claimed in claim 3, wherein the mean particle diameter of the conductive ceramic particles is 0.5–4 μm.

5. The sintered ceramic body as claimed in claim 1, wherein the content of the conductive ceramic particles is 30–50 vol %.

6. The sintered ceramic body as claimed in claim 2, wherein the ratio is 0.01–9.

7. The sintered ceramic body as claimed in claim 1, having an electric resistivity is not higher than 10 Ω.cm.

8. The sintered ceramic body as claimed in claim 7, having an electric resistivity not higher than 5 Ω.cm.

9. The sintered ceramic body as claimed in claim 8, having an electric resistivity not higher than 0.1 Ω.cm.

10. The sintered ceramic body as claimed in claim 1, wherein the insulating ceramic particles are at least one selected from the group consisting of zirconia and alumina and the conductive ceramic particles are at least one selected from the group consisting of titanium nitride, zirconium nitride, titanium carbide, titanium carbonitride, titanium boride, tungsten carbide and niobium carbide.

11. The sintered ceramic body as claimed in claim 10, wherein the zirconia is at least one partially stabilized zirconium composition selected from the group consisting of zirconium oxide stabilized with 1.5–6 mol % of $Y_2O_3$, zirconium oxide stabilized with 8–10 mol % of MgO and zirconium oxide stabilized with 6–12 mol % of $CeO_2$.

12. A process for preparing sintered ceramic bodies comprising insulating ceramic particles whose particle diameter at a cumulative amount ratio of 90% is not larger than 10 μm and conductive ceramic particles whose mean particle diameter is not larger than 10 μm, wherein the content ratio of the conductive ceramic particles is 25–60 vol % based on 100 vol % of the total of the conductive ceramic particles and the insulating ceramic particles, said process comprising mixing insulating ceramic particles whose particle diameter at a cumulative amount ratio of 90% is not larger than 10 μm and conductive particles whose mean particle diameter is not larger than 10 μm at a ratio of 25–60 vol % when the total amount of the insulating ceramic particles and conductive ceramic particles is 100 vol %, compacting the mixture and sintering the compact.

13. The process for preparing sintered ceramic bodies as claimed in claim 12, wherein said insulating ceramic particles have a particle diameter less than 10 μm, and said conductive ceramic particles having a mean particle diameter of 0.5–4 μm and are present in an amount of 30–50 vol %.

14. The process as claimed in claim 12, wherein the insulating ceramic particles are at least one selected from the group consisting of zirconia and alumina, and the conductive ceramic particles are at least one selected from the group consisting of titanium nitride, zirconium nitride, titanium carbide, titanium carbonitride, titanium boride, tungsten carbide and niobium carbide.

15. The process as claimed in claim 14, wherein the zirconia is at least partially stabilized zirconium composition selected from the group consisting of zirconium oxide stabilized with 1.5–6 mol % of $Y_2O_3$, zirconium oxide stabilized with 8–10 mol % of Mgo and zirconium oxide stabilized with 6–12 mol % of $CeO_2$.

* * * * *